UNITED STATES PATENT OFFICE.

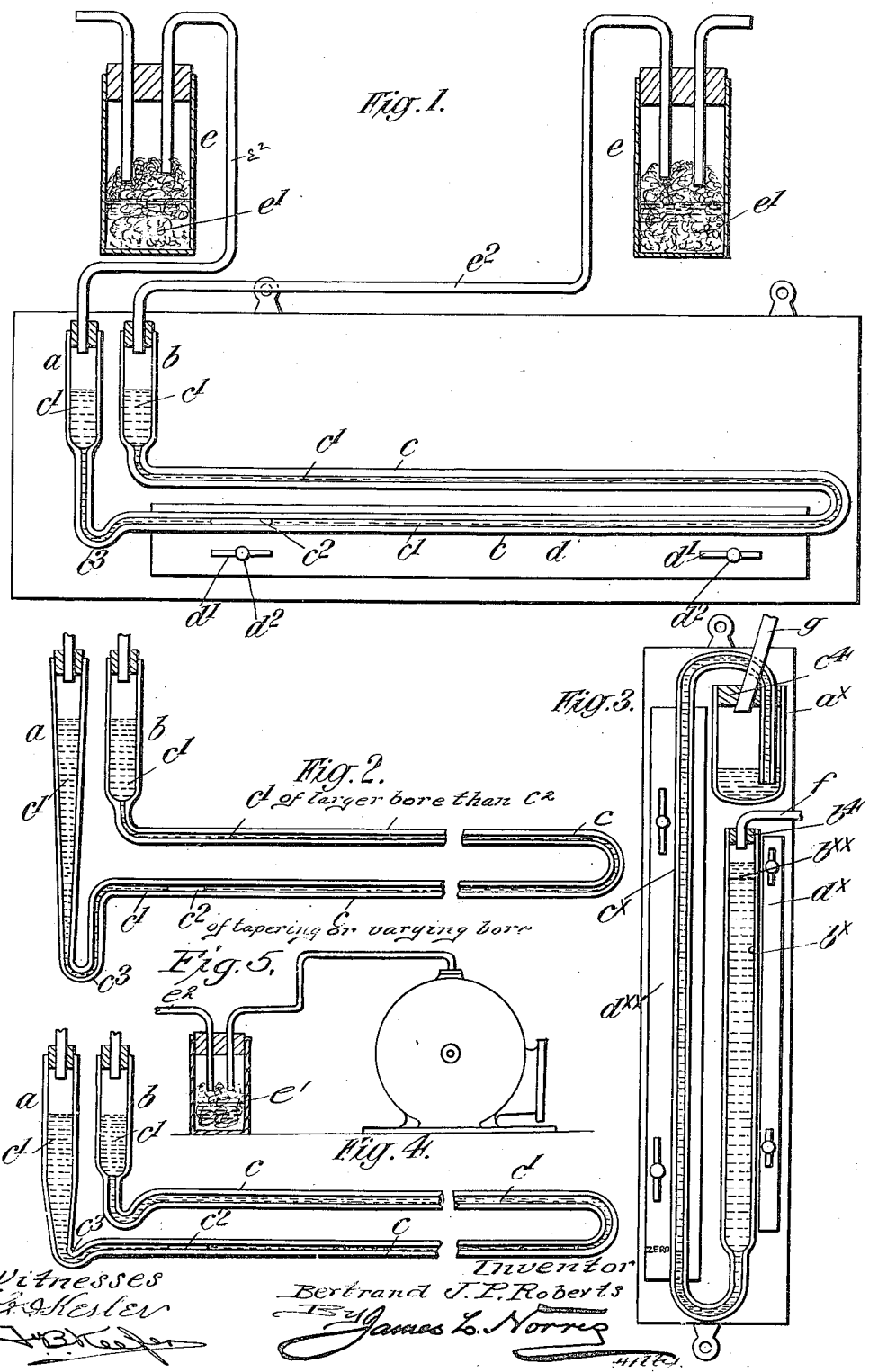

BERTRAND JOHN PRICE ROBERTS, OF SOUTH KENSINGTON, LONDON, ENGLAND.

DIFFERENTIAL-PRESSURE GAGE.

949,598.　　　　　Specification of Letters Patent.　　Patented Feb. 15, 1910.

Application filed December 8, 1906. Serial No. 346,952.

*To all whom it may concern:*

Be it known that I, BERTRAND JOHN PRICE ROBERTS, a subject of the King of Great Britain, residing at 35 Harrington road, South Kensington, in the county of London, England, gentleman, have invented certain new and useful Improvements in or Relating to Differential-Pressure Gages, of which the following is a specification.

This invention relates to differential pressure gages of the kind in which the upper ends of a U-tube are connected to chambers of greater diameter the object of the present invention being to render such gages applicable for use in indicating and registering in connection with a variety of purposes among which may be mentioned indicating and registering the speed of self propelled vehicles, ships, boats, the flow of fluids, changes of pressure, velocity, or level or position; the indication being effected in a simple, effective and economical manner by apparatus of a highly sensitive or responsive character, the device presenting the advantages of indifference to motion and steadiness and reliability of readings and indications.

The apparatus therefore comprises a U-tube (or manometer) provided with bulbs or enlargements of varying diameters or of unequal capacity and containing a liquid, such as water, mercury; the limbs or bulbs being connected by means of a pipe or tube preferably of small bore also containing the aforesaid liquid. By means of a tubular connection, one or both limbs or bulbs is or are placed in communication with the force whereof it is desired to obtain an indication or registration or with a pressure or vacuum creating means adapted for operation by the aforesaid force, and the tube which extends between the bulbs is provided with an index bubble or equivalent device.

The movements of the liquid are read by means of a graduated scale placed near the tube, or the tube itself or the limbs or bulbs of the U-tube may be graduated for the same purpose. The bubble is preferably formed of air, but gas, water, oil, or a bead or a float of suitable specific gravity may be employed. Mercury or other suitable fluid or mixture thereof may take the place of the water or other fluid or mixture in either limb or bulb or in the tube. Provision may be made for preventing or compensating for loss by evaporation of the liquid in the bulb or bulbs and tube. With a view to compensating for the effect of the pressure difference varying as the square of the speed and in order to insure an even or approximately even scale, the bulb or bulbs or the limb or limbs of the U-tube may be formed with a conical or taper bore. The scale may thus be made to open out more or less or to become more or less sensitive at any desired speed or speeds.

The apparatus may, in some cases, be subjected to a treatment by means of a suitable solution or mixture with a view to modifying the effect of the surface tension (or capillarity) of the contents. For example, an oleaginous film may be applied to the interior surfaces.

In order that the invention may be clearly understood and readily carried into effect, I will proceed to describe the same with reference to the accompanying drawings which represent examples of apparatus adapted for effecting the objects aimed at.

Figure 1 represents a design of apparatus adapted for horizontal use generally as a sensitive pressure gage of small range. Fig. 2 illustrates a similar apparatus in which the connecting tube is of two different bores. Fig. 3 illustrates a modified design of gage. Fig. 4 is a view illustrating an alternative design. Fig. 5 is an elevation and part section of a detail of arrangement hereinafter referred to.

The bulbs or limbs $a$, $b$ correspond with the limbs of an ordinary U-tube—these limbs being connected by a horizontally arranged tube $c$ of smaller bore. The bulbs or limbs $a$ and $b$ also the tube $c$ contain a fluid indicated at $c'$—generally alcohol—the tube $c$ containing in addition an index bubble $c^2$ (or other equivalent device), preferably of air, to show the motion of the fluid. If for example it be assumed that the limbs $a$ and $b$ have a bore of 10 millimeters, and the tube $c$ a bore of 1 millimeter, it will be apparent that a rise or fall of the fluid in the limbs, of 1 millimeter, will produce a movement of the index bubble of 100 millimeters; the effect of the air bubble being to form a kind of flexible piston which is practically frictionless. At a suitable point in the tube $c$ a bend is formed—as shown at $c^3$—this bent portion serving as a trap to prevent the accidental loss of the aforesaid bubble $c^2$. This bubble should be of a length approximately equal to the distance between the center lines of the bulbs or limbs $a$, $b$. Thus any changes of level or position will not affect the readings, so long as the readings are only taken on the lower limb of the connecting tube $c$; the disturbing causes being the difference of level in the limbs, produced by changes of position, and the effect of the bubble $c^2$ in the tube $c$ owing to the said bubble being of different specific gravity to the fluid. These two causes counteract each other when the bubble is in the lower branch of the tube $c$ since the bubble, being equal in length to the distance between the center lines of the bulbs compensates for the difference in the level of the limbs when the device is tilted by equalizing the heads of liquid in the two portions of the connecting tube. If the bubble were of greater or less length than the distance between the center lines or if it were in the upper portion of the tube, it would fail to equalize the heads in the two portions of the tube and consequently were the device to be tilted there would be such movement of the liquid in the limbs and tube as would be necessary to an equalization or balance of the two heads of liquid.

In connection with the foregoing statements it should be said that since the air bubble is made equal in length to the distance between the limbs $a$, $b$, when the device is tilted, the difference of head in the two limbs is nullified by the space occupied by the air bubble $c^2$. If this space contained liquid instead of air there would be a pressure head in the limb $a$ over and above that in the limb $b$ but as this space contains air this head is reduced by a corresponding amount, so that the actual head in each limb of the gage is in reality the same and there will, therefore, be no tendency for the bubble to move relatively to the gage tube on tilting. The readings are taken in the lower limb in order to get the compensating effect referred to, for, were the index bubble in the upper limb, it would tend to increase the ill effects of tilting.

The scale $d$ is made movable by means of slots $d'$ and set screws $d^2$ as shown, so that the position of zero may be adjusted when necessary without it being necessary to add or subtract fluid from either bulb or limb.

A device may be employed with the indicator adapted to prevent or compensate for evaporation; such device consisting of a vessel $e$ containing a certain amount of the same fluid which is employed in the indicator, together with some wick or sponge $e'$ or other absorbent substance. This arrangement may be connected to a tube $e^2$ leading to the indicator, or there may be one on the pressure side and another on the suction or vacuum side; the air or gas passing through the vessel $e$ and there becoming saturated with vapor. Consequently the fluid in the indicator will need renewal or adjustment very seldom. There may not be both pressure and vacuum in every case, as one side may be neutral. The principle is, however, the same. A somewhat similar arrangement may be adopted to prevent the fluid in the indicator taking up water, a hygroscopic substance being employed to prevent this in a well known manner. This absorption of water vapor might be serious in the case of an indicator used as an anemometer, as shown in Fig. 2 (hereinafter described) as not only would the quantity of fluid tend to vary but the specific gravity would also alter considerably in the case of alcohol, for example. In this form of the device the tube $c$ is shown as formed with different size bores. Fig. 3 shows a two fluid form of gage having the connecting tube vertically disposed and the junction of the fluids forming the index point. $a^x$, $b^x$ are the two limbs or bulbs connected by a tube $c^x$. For convenience, the bulb $a^x$ may be a separate piece, the tube $c^x$ being connected thereto through the plug or stopper $c^4$.

The indicator contains two fluids, of different specific gravities of which the lighter occupies the bulb $a^x$ and tube $c^x$ down to zero, when the instrument is out of action; the other fluid being contained in the limb $b^x$ and the lower part of $c^x$. These fluids are such that they do not mix, and one or both may be colored. In the form illustrated it is assumed that the lighter fluid is of a red color. A small amount of this fluid is contained at $b^{xx}$ in the bulb $b^x$ and floats on the heavier fluid. The purpose of this arrangement is to insure only one fluid being exposed to evaporation or atmospheric influence. Amyl alcohol is found to be a suitable fluid to use as the lighter fluid; a proportion of ordinary alcohol being added in some cases to prevent adherence to the tube. The heavier fluid may be water, with glycerin, calcium chlorid or other substance or substances dissolved or mixed with or in it, so as to lower the surface tension and freezing point.

It may be remarked that it is preferable not to use pure water as its surface tension is so high that there is no definite zero, if any sensitiveness is required.

The scale shown at $d^x$, $d^{xx}$ may be adjustable for the zero so that they may be rectified as occasion may require. The scale $d^x$ is provided for use when the motion of the fluid is such that the index point moves beyond the limit of the scale $d^{xx}$. It will be seen that, when the heavier fluid has turned the upper corner and entered $a^x$ the action is similar to that of an ordinary U-tube, and the pressure difference can be ascertained by the reading on the scale $d^x$ of the displacement of the fluid in the limb $b^x$. The range of any given instrument is thus greatly extended though the sensitiveness is not so great. The indicator is connected with the source of pressure difference employed by means of the tubes $f$, $g$ which project from the stoppers $b^4$, $c^4$ of the respective limbs.

In Fig. 2 a form of the device is illustrated which is suitable for use as an anemometer and as an air bubble index. The sensitiveness of the instrument is secured by providing bulbs of varying capacity and by having the lower leg of the capillary tube joining the same, of varying bore, the sensitiveness of the gage at different parts of the scale being correspondingly changed. This variation depends upon the particular application of the gage. In this connection it will be seen that the upper portion of the tube $c$ is of larger bore than the lower portion. There may be contractions or enlargements of the bore at various points in its length. There may also be employed floats or indices similar to a maximum or minimum thermometer.

In order to minimize any temperature error, it is advisable that an approximately equal amount of fluid be contained in the instrument on each side of the index point.

In the event of the apparatus Figs. 1, 2, and 4 being tilted, say, into a position in which the level of the liquid in the bulb or limb $a$ is higher than the level of the liquid in the bulb $b$ the bubble will have a tendency to rise in the direction of the bulb $a$ but since the head of liquid in the bulb $a$ is above that in the bulb $b$ and also on account of the surface tension due to the capillary nature of the tube the tendency is opposed and if the bubble be adjusted to a certain required length, i. e. a length equal to the distance between the center line of the bulbs, the difference in head of liquid can be made to balance the tendency of the bulb to rise. Hence the apparatus may be tilted to any reasonable extent without interfering with the bubble. The index may be formed in any of the ways described but an air bubble is preferred. Records of the indications may be obtained in any convenient or well known manner such for instance as by photographic or electrical means.

The present invention is applicable for many purposes and may be used in connection with any known means for producing a pressure difference. For example, as an anemometer, it may be connected to a Dine's head or Pitot's tube or similar device; an analogous method may be used for gaging the velocity of fluids, whether in pipes or channels or otherwise. In these and similar cases, several Pitot's tubes or equivalent devices may be placed at different points in the current or stream of air, gas or fluid, and be connected to one (or more) of the indicating gages, the object being to obtain steadier, more uniform and reliable readings, and which will more correctly represent the average velocity of the stream or current, as this is liable to vary at any one point in most cases, and is apt to result in an incorrect reading of the average flow. If a fan or equivalent device be used in connection with the gage, the scale may be marked so as to indicate revolutions instead of, or in addition to, the pressure; thus the readings may be used to show or indicate the speed of any mechanism by which the fan (Fig. 5) is actuated or with which it is connected. Alarm or excess motion devices may be actuated in this way—as hereinbefore mentioned—and auxiliary mechanism set in motion or other effects produced as desired. It may be mentioned that the insertion and adjustment of the (air) bubble in the horizontal form is most easily effected by means of a fine point syringe inserted in the bulb or limb connected to the upper branch of the connecting tube $c$ (Fig. 1).

Although I prefer to employ air as the actuating or transmitting medium I wish it to be understood that the difference of pressure may be produced by any other gas or fluid or by mercury or other heavy fluid. It is to be further understood that the devices described are examples only and that the invention is capable of application to many purposes such as the flow of fluids or gases whether free or in channels or pipes, changes of pressure, velocity or level, and generally any purpose in which changes of level or position or of velocity or pressure, whether direct or indirect, can be indicated thereby. I may however mention that the particular uses I have in view are in connection with mechanically or electrically or other self propelled road vehicles of all kinds, railway vehicles, steam-ships, submarines, anemometers.

What I claim and desire to secure by Letters Patent of the United States is:—

1. A differential pressure gage comprising a fluid-containing U-shaped capillary tube and a pair of chambers of greater diameter than the U tube and connected to the ends thereof, the tube having an index therein which renders the gage insensitive to differences of level or variations of position.

2. A differential pressure gage comprising a pair of chambers and a horizontally arranged U-shaped capillary tube connecting the said chambers and having fluid and an air bubble index therein, the index being of a length equal to the distance of separation of the center lines of the chambers.

3. A differential pressure gage comprising a pair of chambers and a horizontally arranged U-shaped capillary tube connecting the said chambers and having a bent portion constituting a trap, the tube containing fluid and an air bubble index equal in length to the distance of separation of the center lines of the chambers.

4. A differential pressure gage comprising a pair of chambers, a capillary tube connecting the said chambers and having fluid and an index therein, a vessel containing a quantity of the liquid employed in the gage and an absorbent substance and a connection between the vessel and one of the said chambers.

5. In differential pressure gages, in combination, a horizontally disposed tube having connected upper and lower legs, and a vertical bulb of greater diameter than said horizontally disposed tube connected to each leg, there being an indicating fluid in said tube and vertical bulbs, said fluid having an index bubble in the lower leg of the tube equal in length to the distance between the center lines of the bulbs.

6. In differential pressure gages, in combination, a horizontally disposed tube having connected upper and lower legs, a vertical bulb of greater diameter than said horizontally disposed tube connected to each leg, a trap formed in the lower leg and an index fluid in said tube and bulbs, said fluid having a compensating index bubble in the lower leg of the tube.

In testimony whereof I affix my signature in presence of two witnesses.

BERTRAND JOHN PRICE ROBERTS.

Witnesses:
 JOHN ROBINSON,
 ARTHUR HAPGOOD.